United States Patent
Rollins et al.

(10) Patent No.: US 10,323,711 B2
(45) Date of Patent: Jun. 18, 2019

(54) BREAKABLE DUCT FOR USE WITH A MOTOR VEHICLE AIR INDUCTION SYSTEM

(71) Applicant: Ford Global Technologies, LLC, Dearborn, MI (US)

(72) Inventors: Scott M. Rollins, Canton, MI (US); John Qingrui Liu, Ann Arbor, MI (US); John Marsh, Rayleigh (GB); Eric Wells, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 15/602,717

(22) Filed: May 23, 2017

(65) Prior Publication Data
US 2018/0340587 A1 Nov. 29, 2018

(51) Int. Cl.
*F02M 35/10* (2006.01)
*F16F 7/00* (2006.01)

(52) U.S. Cl.
CPC ....... *F16F 7/003* (2013.01); *F02M 35/10091* (2013.01); *F02M 35/10236* (2013.01)

(58) Field of Classification Search
CPC ....... F02M 35/10111; F02M 35/10144; F02M 35/10078; F02M 35/10321; F02M 35/10; F02M 35/104; F02M 35/10039; F02M 35/10262; F02M 35/10091; F02M 35/10137; F02M 35/10242; F02M 35/1277; B29C 45/0001; B29C 2049/2017;

(Continued)

(56) References Cited

U.S. PATENT DOCUMENTS 1,971,595 A * 8/1934 Booth .................. F16L 11/15
138/128
5,699,835 A * 12/1997 Nakagawa .......... B29C 33/0044
138/141

(Continued)

FOREIGN PATENT DOCUMENTS

| DE | 10352721 | 6/2005 |
|---|---|---|
| DE | 102008008344 | 8/2009 |

(Continued)

*Primary Examiner* — Marguerite J McMahon
*Assistant Examiner* — Teuta B Holbrook
(74) *Attorney, Agent, or Firm* — LeClairRyan (57) ABSTRACT

The disclosed inventive concept provides a crushable air duct having formed thereon a series of strategically positioned and patterned crack-initiating grooves. The grooves allow the air duct to be crushed in an impact event and a specified impact force, thereby protecting adjacent and higher cost under hood components from damage. In an impact event, the series of grooves allows the cracks in the air duct to readily propagate throughout the pattern in a controlled and predictable manner. The crushable air duct is formed from a rigid polymerized material. The duct includes an inlet and an outlet. The grooves are formed on either or both the exterior surface and the interior surface of the duct. Some of the grooves extend generally between the inlet and the outlet. These grooves are preferably parallel. Other grooves are circumferentially formed around the duct. At least some of the parallel and circumferential grooves intersect.

16 Claims, 8 Drawing Sheets

(58) Field of Classification Search
CPC . B29C 2049/2069; B29C 49/00; B29C 49/04;
B29C 49/20; B60K 13/02
USPC ............ 138/118, 118.1, 120, 123, 128, 135;
123/184.21, 184.61
See application file for complete search history.

(56) References Cited

U.S. PATENT DOCUMENTS

| | | | | |
|---|---|---|---|---|
| 6,129,120 | A * | 10/2000 | Margot | H02G 3/0468 138/121 |
| 6,220,023 | B1 * | 4/2001 | Ezzeddini | F01N 13/1816 138/118 |
| 2003/0024584 | A1 * | 2/2003 | Godel | F01N 13/1816 138/118 |
| 2003/0024585 | A1 * | 2/2003 | Otsuka | F01N 13/08 138/121 |
| 2003/0075923 | A1 * | 4/2003 | Lepoutre | F02M 35/10144 285/330 |
| 2004/0069261 | A1 * | 4/2004 | Lepoutre | F02M 35/1272 123/184.61 |
| 2006/0125149 | A1 * | 6/2006 | Takada | B29C 45/435 264/328.2 |
| 2008/0202620 | A1 * | 8/2008 | Van Hooren | F02M 35/10019 138/126 |
| 2009/0165740 | A1 * | 7/2009 | Kubo | F02M 35/10039 123/184.55 |
| 2009/0188461 | A1 * | 7/2009 | Kummermehr | F02B 25/14 123/184.52 |
| 2009/0282793 | A1 * | 11/2009 | Tomlin | F02M 25/0854 55/385.3 |
| 2010/0192891 | A1 * | 8/2010 | Catton | F02M 35/10098 123/184.21 |
| 2012/0012074 | A1 | 1/2012 | Adrian et al. | |
| 2012/0292127 | A1 * | 11/2012 | Teshima | F02M 35/10144 181/224 |
| 2016/0245243 | A1 * | 8/2016 | Khang | F02M 35/10032 |

FOREIGN PATENT DOCUMENTS

DE 102011007668 11/2012
DE 102014001957 8/2015

* cited by examiner

BREAKABLE DUCT FOR USE WITH A MOTOR VEHICLE AIR INDUCTION SYSTEM

TECHNICAL FIELD

The disclosed inventive concept relates generally to air induction systems for use with the internal combustion engine of a vehicle. More particularly, the disclosed inventive concept relates to a crushable or collapsible air conduit or duct having strategically positioned and patterned break-initiating grooves that provide a wall thickness engineered to fail at a specified load to prevent subsequent damage to higher cost under-hood components.

BACKGROUND OF THE INVENTION

The internal combustion engine conventionally includes an air induction system (AIS) for delivering ambient air to the throttle body and ultimately into the combustion chamber as part of an air-fuel mixture. The air induction system includes an air duct that initially takes in the ambient air and passes the incoming air into and through the air filter box. Typically the air duct is a generally inexpensive unit that is conventionally positioned adjacent more expensive under hood components such as the Air Conditioner (A/C) condenser, the radiator and parts associated with the radiator including the fan unit (or units) and the fan shroud.

During an impact event, the radiator and the associated fan unit and shroud are pushed vehicle rearward into the engine compartment. This problem can arise even in a low speed impact in which components of the "cooling pack" (the A/C condenser, the radiator, the fan unit, and the fan shroud) as well as the bolster are pushed vehicle-rearward by about 100 mm. To minimize the additional damage to the radiator, the fan unit and the fan shroud, industry requirements for "Low Speed Damageability" (LSD) exist for automotive vehicles and are applied to the AIS ducts. These rules require that the zone vehicle-rearward of the radiator be either empty or only contain parts that will exert minimal resistance on the movement of the radiator, fan unit and fan shroud in an impact event. The force from the AIS duct that resists movement of the radiator, fan unit and fan shroud must be sufficiently low so that the A/C condenser, radiator, fan unit and fan shroud are not damaged during an impact event, to minimize the cost of repair.

Given the concern over a possible impact event, today's AIS dirty side duct (DSD) is at risk of not meeting the safety LSD cascaded target. The cascaded target sought after by automotive designers involved in vehicle safety is to have the DSD collapse when put under a predetermined acceptable force such as 500N in an impact event in order to meet LSD requirements. A "successful" impact event result is that there is no post-crash damage to components such as the NC condenser, the radiator, the fan unit, the fan shroud, the battery or the battery cover.

Of components at risk during an impact event, the air induction duct is usually the most inexpensive component to sacrifice and replace. In an effort to respond to LSD requirements, auto manufacturers desire to provide an air duct that is strong enough to perform under all engine conditions but yet is weak enough to break in a low speed impact and vacate space for more complex and more expensive components to move into without causing damage to these components. In an effort to satisfy this need, manufacturers use soft elastomer/rubber materials for the AIS ducts and hoses. However, elastomeric parts can cost and weigh more than that of molded rigid plastic parts. Such components also tend to be heavier than molded rigid plastic parts and thus add undesirable extra weight to the vehicle.

Accordingly, known approaches to reducing damage to expensive under hood components in an impact event have not always produced satisfactory results. As in so many areas of vehicle technology, there is always opportunity for improvement related to designs for AIS components.

SUMMARY OF THE INVENTION

The disclosed inventive concept provides a crushable or collapsible air induction duct having formed thereon a series of strategically positioned and patterned crack-initiating grooves. The grooves allow the air duct to be crushed in an impact event, thereby protecting adjacent and higher cost under hood components from damage. Such components include but are not limited to the radiator, the cooling fan, the cooling fan shroud, and air conditioner components. In an impact event, the series of grooves allows the cracks in the air duct to readily propagate throughout the pattern in a controlled and predictable manner. The crushable air duct of the disclosed inventive concept demonstrates performance in an impact event that is at least equal to or better than known elastomer versions. The crushable air duct of the disclosed inventive concept preferably though not absolutely crushes at a predetermined acceptable force such as 500N.

Crushable air duct of the disclosed inventive concept includes a body having an air inlet and an air outlet. A series of grooves is formed on the outside of the body, though the grooves may also or alternatively be formed on the inside of the body. The pattern of the grooves may be regular, such as square, triangular or hexagonal. Alternatively, the pattern of the grooves may be irregular. Preferably but not absolutely two sets of grooves are provided, although only one set may be provided. One set extends generally between the air inlet and the air outlet. The grooves of this set are parallel. The other set of grooves, if provided, are circumferentially formed around the body of the crushable air duct. At least some of the two sets of grooves, if both sets are provided, intersect one another.

To enhance the crushable characteristics of the crushable air duct, the body is formed from a readily breakable, rigid polymerized material. Non-limiting examples of usable polymerized materials include polypropylene, high-density polyethylene, and acrylonitrile styrene acrylate.

The crushable air duct of the disclosed inventive concept may be formed from a single piece of rigid polymerized material or may be formed from multiple pieces, such as multiple shells that are attached together. Attachment of one shell to the other may be made by any number of methods including, without restriction, clasps, snap-fit assemblies, and plastic welding.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate an intake manifold according to the disclosed inventive concept. Particularly, FIGS. 1 through 4 illustrate the crushable duct of the air induction system illustrated in position in an engine compartment of a vehicle under normal operating conditions. The crushable duct itself is illustrated in isolation in various views in FIGS. 5 through 11. The crushable duct is illustrated in its crushed condition within an engine compartment following an impact event in FIG. 12.

It is to be understood that the under-hood features and arrangement may be different from those illustrated in FIGS. 1 through 4 and 12 without deviating from the spirit or scope of the disclosed inventive concept. It is also to be understood that additional configurations of the crushable duct of the disclosed inventive concept could be adopted without deviating from the spirit or scope of the disclosed inventive concept.

Referring to FIGS. 1 through 4, an engine compartment of a vehicle is illustrated. The engine compartment, generally illustrated as 10, include crushable duct 12, an air cleaner box 14 shown partially in broken lines, and a radiator 16. A fan shroud 17 is fixed to the vehicle-rearward side of the radiator 16. A replaceable air filter (not shown) is conventionally provided within the air cleaner box 14.

Figure 1:
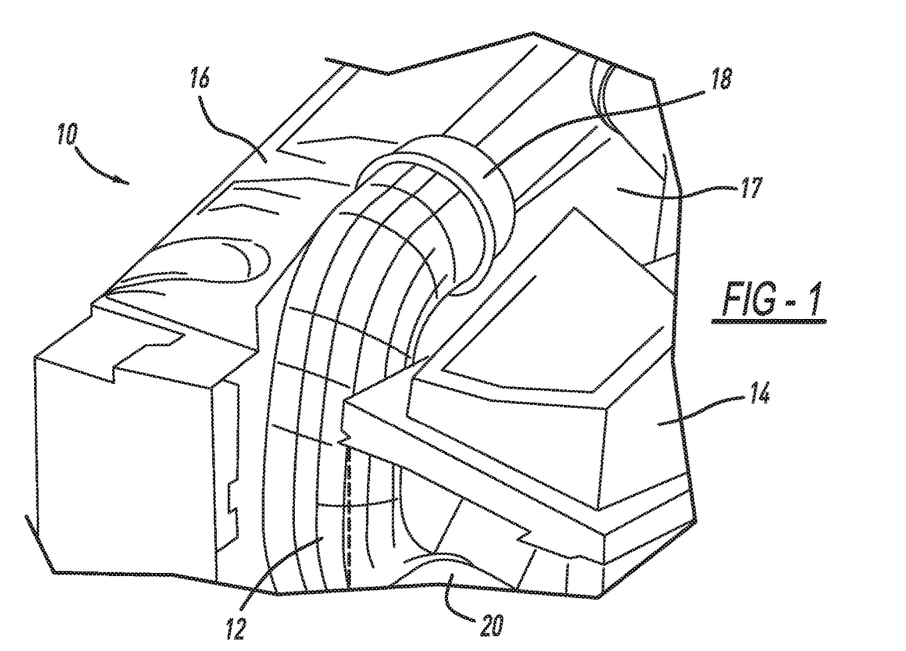
FIG. 1 is an environmental view of the crushable duct according to the disclosed inventive concept in its position within an engine compartment according to a perspective view.
Figure 2:
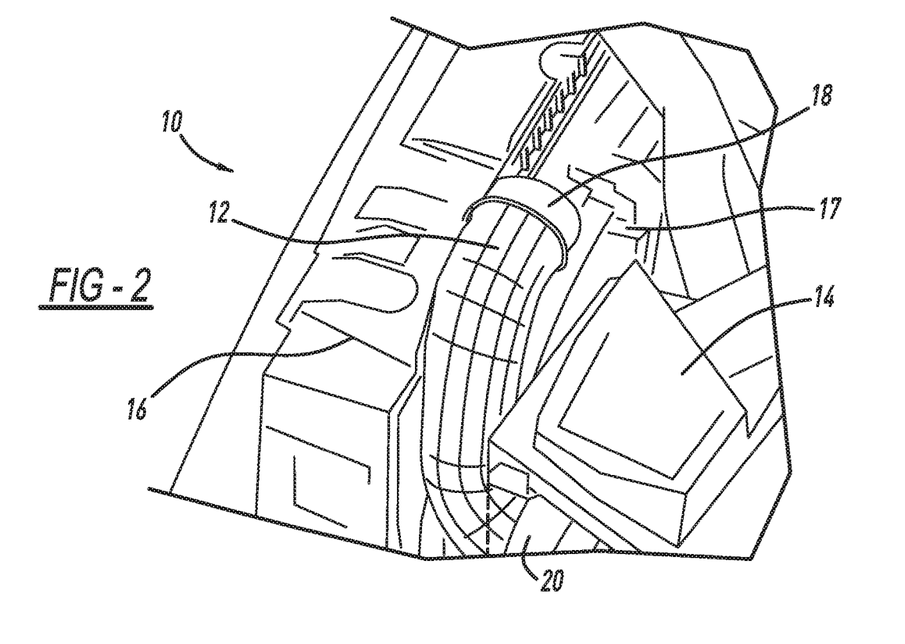
FIG. 2 is an alternate view of the environmental view according to FIG. 1.
Figure 3:
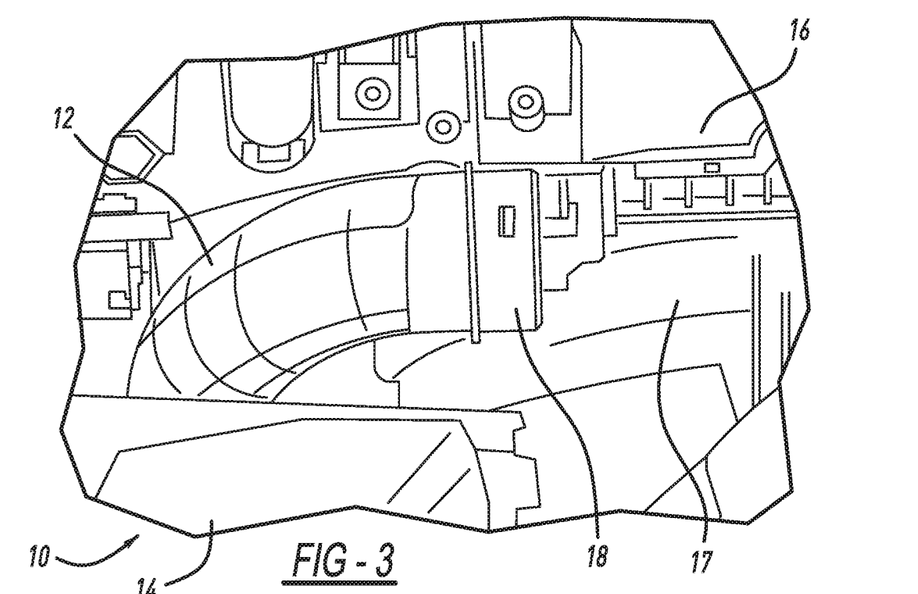
FIG. 3 is an environmental view similar to that of FIG. 1 but viewed from the top.
Figure 4:
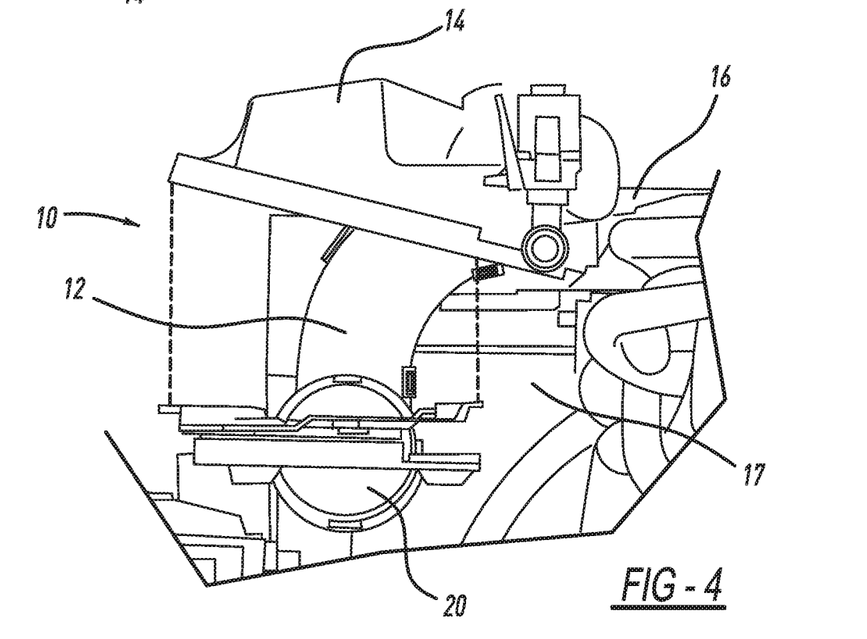
FIG. 4 is an environmental view similar to that of FIG. 1 but viewed from a side.
Figure 5:
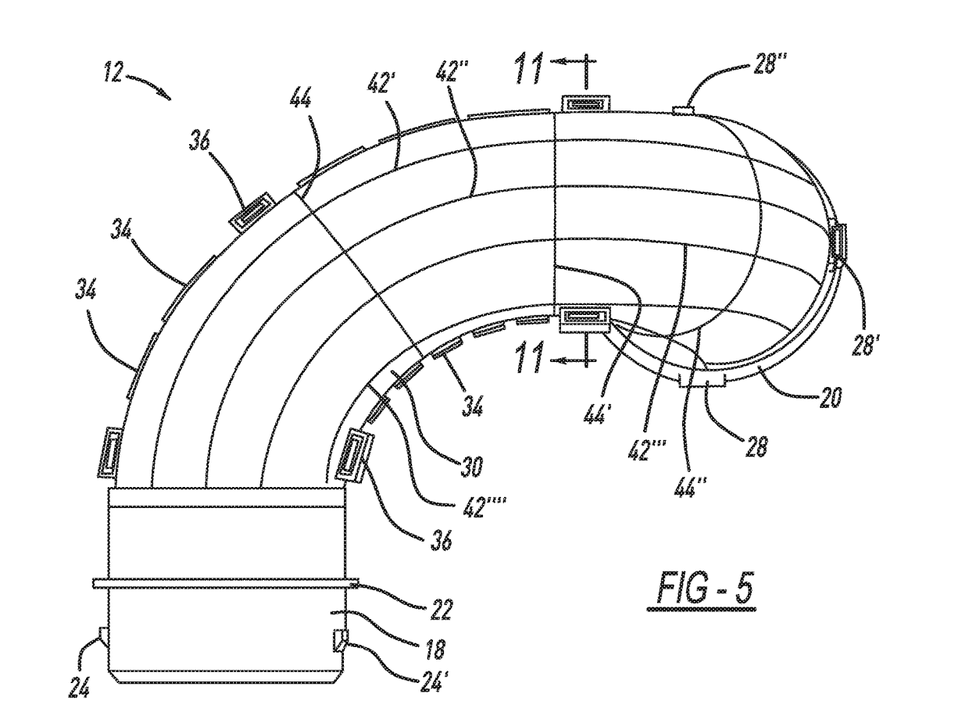
FIG. 5 is a front view of the crushable duct of the disclosed inventive concept.
Figure 6:
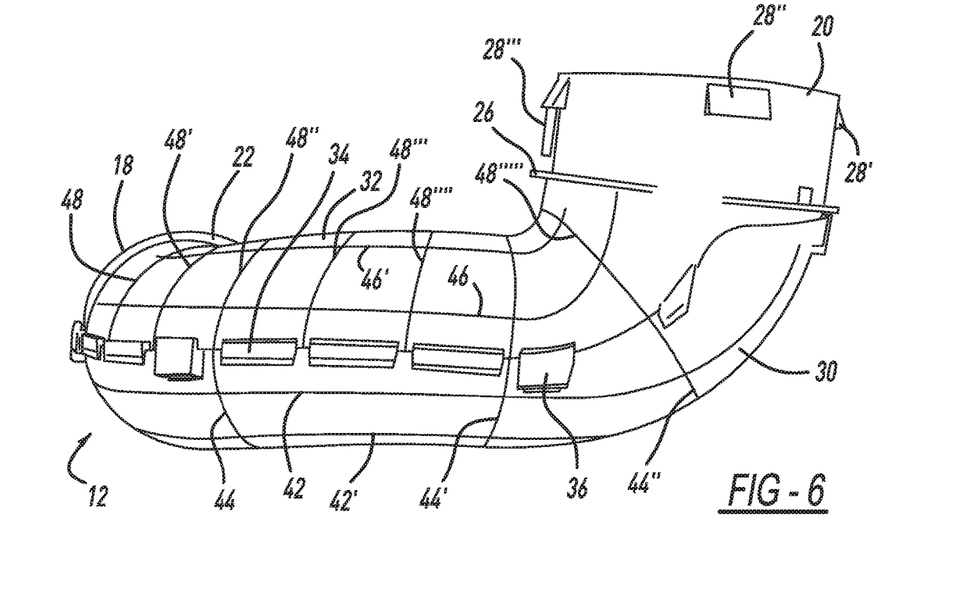
FIG. 6 is a first side view of the crushable duct of the disclosed inventive concept.
Figure 7:
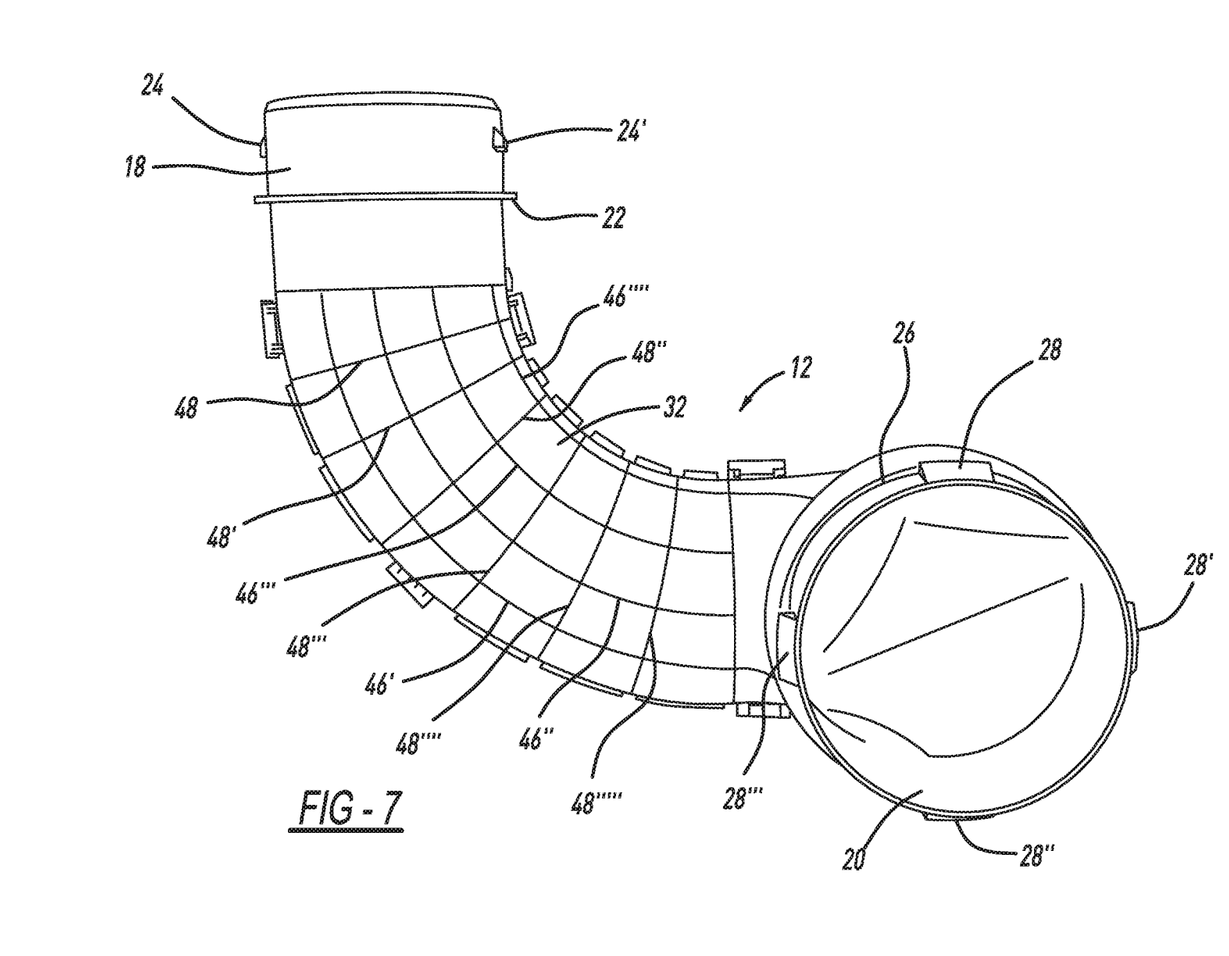
FIG. 7 is a back view of the crushable duct of the disclosed inventive concept.
Figure 8:
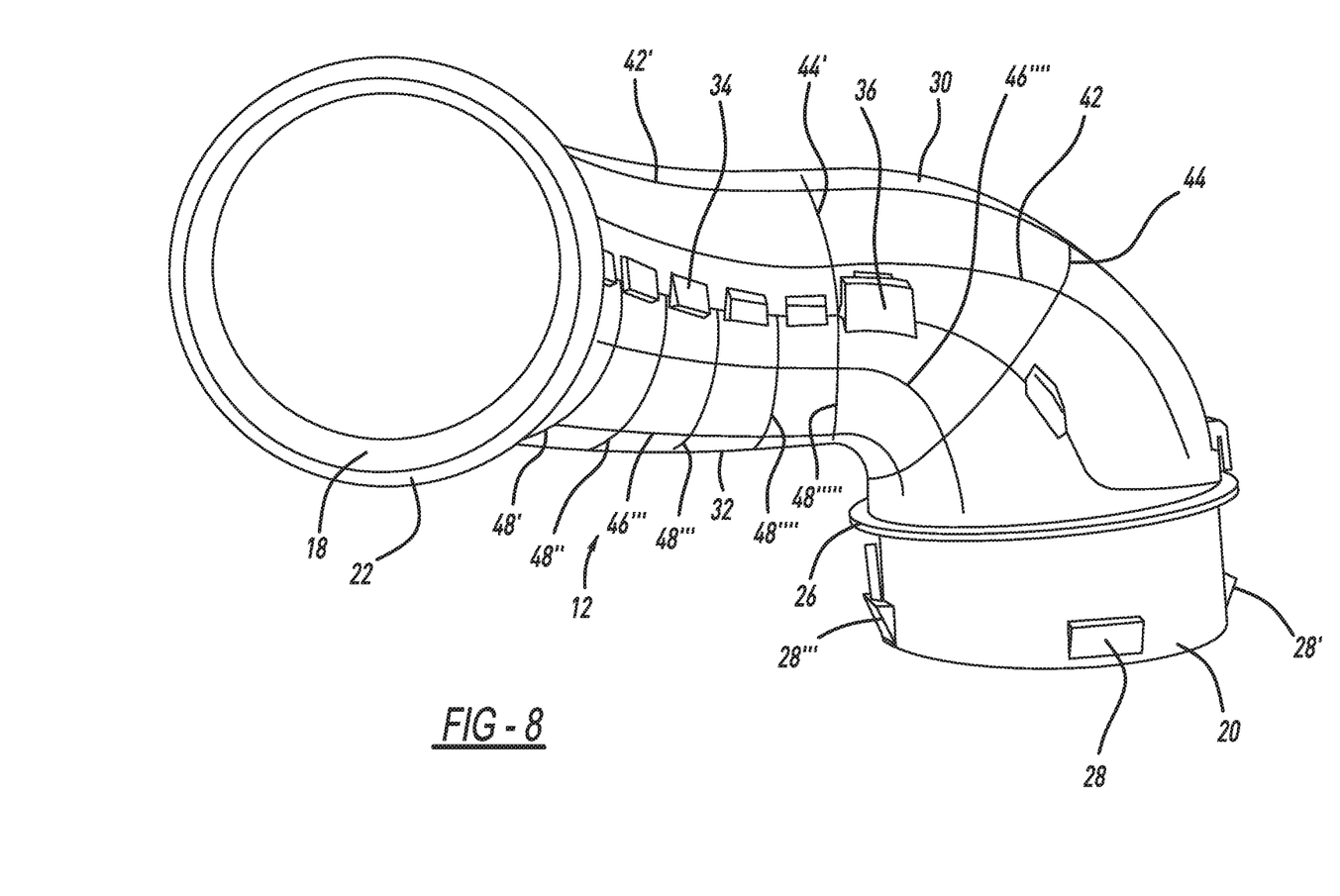
FIG. 8 is a second side view of the crushable duct of the disclosed inventive concept.
Figure 9:
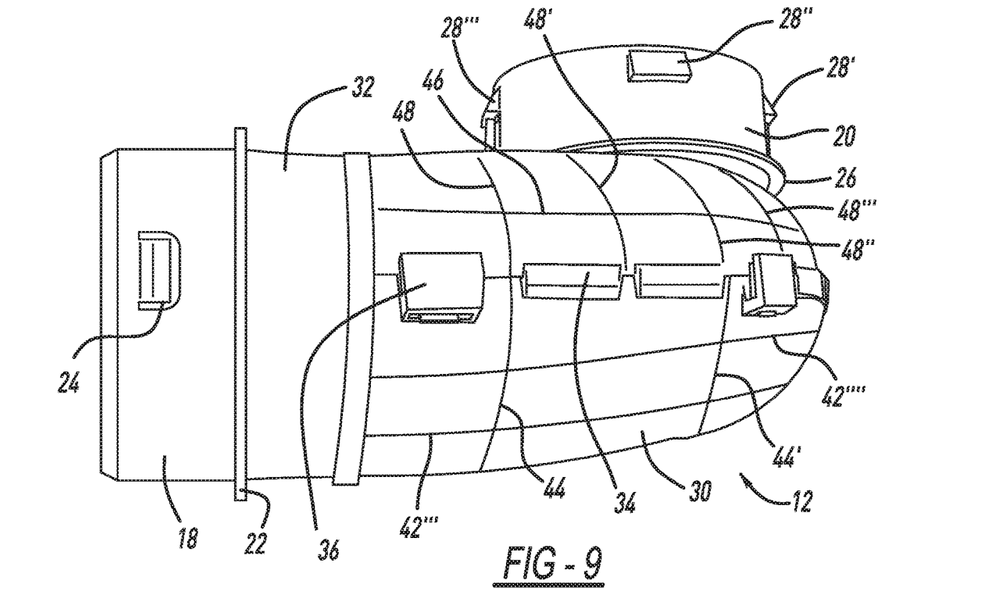
FIG. 9 is a top view of the crushable duct of the disclosed inventive concept.
Figure 10:
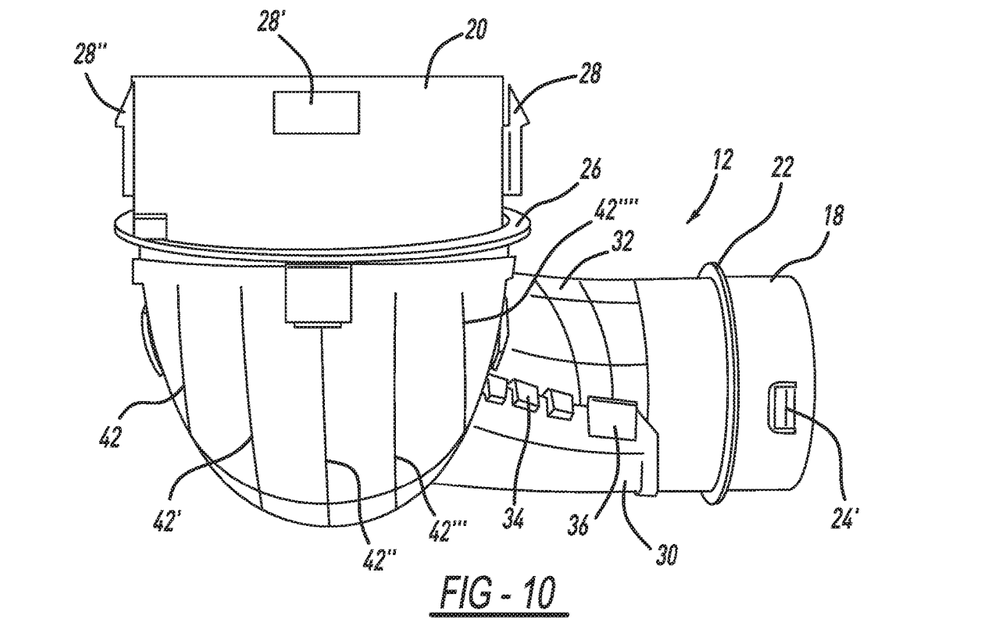
FIG. 10 is a bottom view of the crushable duct of the disclosed inventive concept.

The crushable duct 12 is a dirty side duct (DSD) and receives incoming air at its inlet end 18 (illustrated in FIGS. 1 through 3) and delivers exhaust air from its outlet end 20 (illustrated in FIGS. 1, 2 and 4). An air inlet (not shown) is conventionally attached to the inlet end 18 of the crushable duct 12. The outlet end 20 of the crushable duct 12 is fluidly associated with the air cleaner box 14. The air cleaner box 14 passes incoming air, now filtered, to the engine intake (not shown).

The crushable duct 12 is illustrated in isolation in various views in FIGS. 5 through 11. Referring to these figures, a front view of the crushable duct 12 is illustrated. The air inlet end 18 preferably but not necessarily includes a circumferential stop flange 22 against which the air inlet rests upon insertion. The air inlet end 18 additionally includes a locking arrangement for locking attachment to the air inlet. Such a locking arrangement may include, for example, attachment tabs 24 and 24'.

The air outlet end 20 preferably but not necessarily includes a circumferential stop flange 26 against which the air inlet rests upon insertion. The air inlet end 18 additionally includes a locking arrangement for locking attachment to the air cleaner box 14. Such a locking arrangement may include, for example, attachment tabs 28, 28', 28" and 28'''.

The crushable duct 12 may be formed from any of several rigid polymerized materials that allow for good strength but frangibility along the engineered grooves. Non-limiting examples of such rigid materials include polypropylene (PP), high-density polyethylene (HDPE), and acrylonitrile styrene acrylate (ASA) or any combination thereof.

Figure 11:
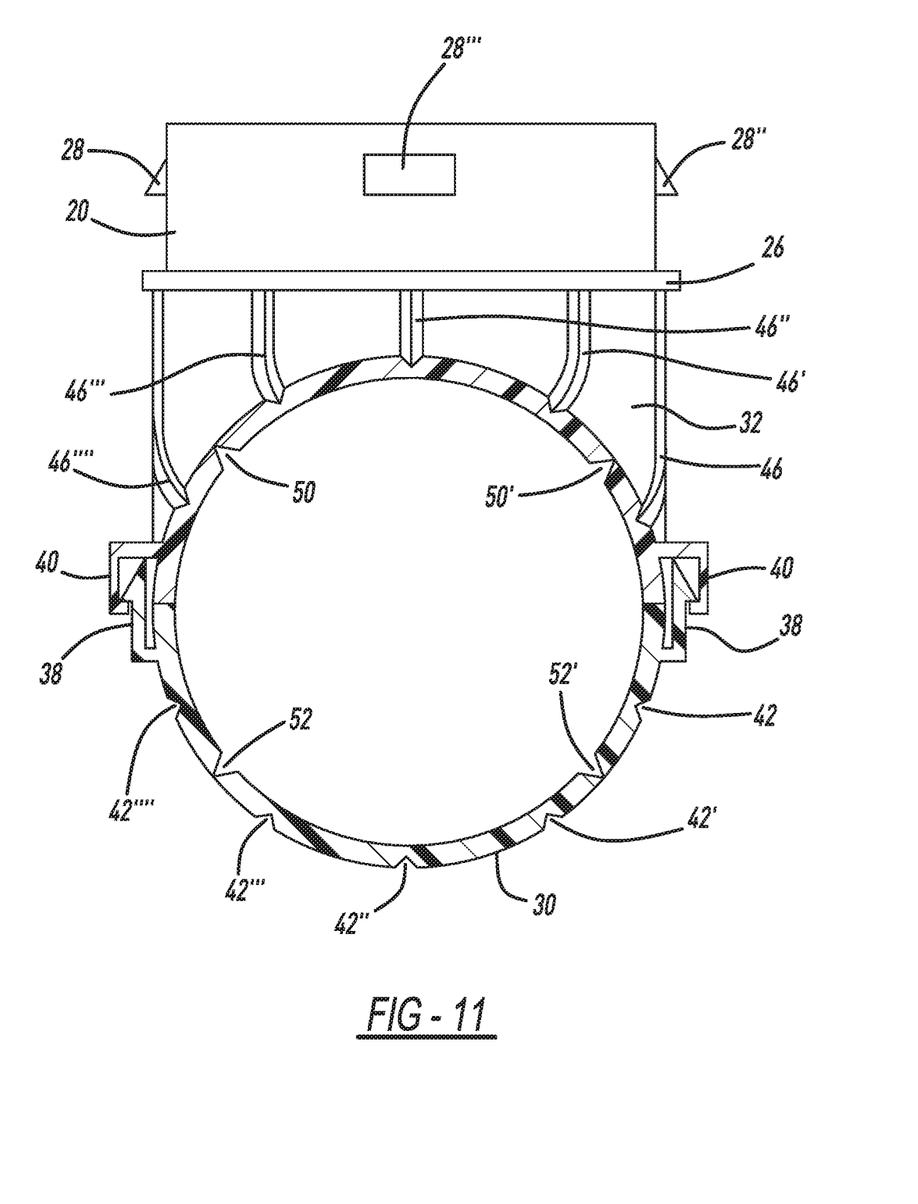
FIG. 11 is a sectional view of the crushable duct of the disclosed inventive concept taken along line 11-11 of FIG. 5.

The crushable duct 12 is preferably though not necessarily molded from multiple pieces. Multi-piece construction helps to reduce manufacturing cost. Preferably, although not necessarily, the crushable duct 12 is formed from two connected shells, a first shell 30 and a second shell 32. The first shell 30 and the second shell 32 may be attached to one another. Attachment of the first shell 30 to the second shell 32 may be accomplished by any number of methods, including mechanical fasteners or, as illustrated, by a series of attachment fasteners that comprise tabs 34 and snap-fit assemblies 36, either standing alone or in combination. As illustrated in FIG. 11, each snap-fit assembly 36 includes a cantilever snap portion 38 and a latch portion 40.

As previously noted, the crushable duct 12 is made collapsible or crushable by a series of strategically positioned and patterned break-initiating grooves. The grooves provide a focused area of reduced wall thickness that is engineered to fail at a specified load. This design-in and tunable failure allows the crushable duct 12 to be crushed and generally flattened to prevent subsequent damage to higher cost under-hood components. The engineered groove pattern and the orientation of the grooves allow the cracks to be controlled and to easily propagate throughout the crushable duct 12 upon impact. Preferably, the crushable duct 12 must crush at less than an acceptable predetermined impact force.

Each of the first shell 30 and the second shell 32 includes a series of grooves that define patterns. While the grooves are illustrated as being formed on the outside of the shells 30 and 32 as illustrated in FIGS. 5 through 11, it is to be understood that the grooves may also be formed on the inside of one or both of the shells 30 and 32, as illustrated in FIG. 11.

A first series of grooves is formed on the first shell 30. A first set of parallel grooves comprising grooves 42, 42', 42", 42''' and 42'''' is illustrated. The parallel grooves 42, 42', 42", 42''' and 42'''' are generally formed between the air inlet end 18 and the outlet end 20 although the grooves may be shorter. The widths and depths of the parallel grooves 42, 42', 42", 42''' and 42'''' may be adjusted as needed to produce the desired crushed result.

Generally perpendicular to the parallel grooves 42, 42', 42", 42''', and 42'''' is a set of circumferential grooves 44, 44', and 44". It is to be understood that a greater or lesser number of parallel grooves 42, 42', 42", 42''' and 42'''' and circumferential grooves 44, 44' and 44" may be formed on the first shell 30.

A second series of grooves is formed on the second shell 32. A first set of parallel grooves comprising grooves 46, 46', 46", 46''' and 46'''' is illustrated. The parallel grooves 46, 46', 46", 46''' and 46'''' are also generally formed between the air inlet end 18 and the outlet end 20 although the grooves may be shorter. The widths and depths of the parallel grooves 46, 46', 46", 46''' and 46'''' may be adjusted as needed to produce the desired crushed result.

Generally perpendicular to the parallel grooves 46, 46', 46", 46''', and 46'''' is a set of circumferential grooves 48, 48', 48", 48''', 48'''' and 48'''''. It is to be understood that a greater or lesser number of parallel grooves 46, 46', 46", 46''', and 46'''' and circumferential grooves 48, 48', 48", 48''', 48'''' and 48''''' may be formed on the second shell 32.

As noted above, the grooves may be formed internally as well as externally on the first shell 30 and the second shell 32. While FIGS. 5 through 10 illustrate the parallel and circumferential grooves formed externally, FIG. 11 illustrates a set of grooves formed internally. With reference thereto, the first shell 30 includes an internal set of parallel grooves 50 and 50' and the second shell 32 includes an internal set of parallel grooves 52 and 52'. A greater or lesser number of grooves 50, 50', 52 and 52' may be formed.

Figure 12:
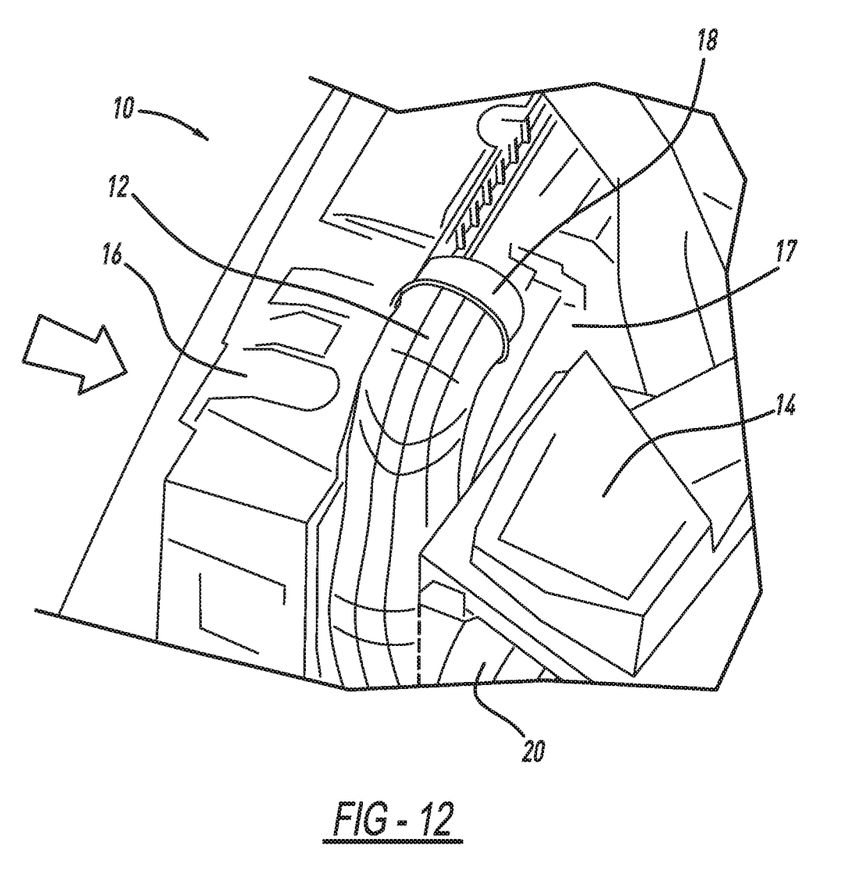
FIG. 12 is a view similar to that of FIG. 1 but illustrating the crushable duct in its environment after an impact event.

While FIGS. 1 through 11 illustrate the crushable duct 12 as it would appear before an impact event, FIG. 12 illustrates the crushable duct 12 following an impact event. As shown, the vehicle has been impacted as illustrated by the arrow. Following the impact event, the radiator 16 has been pushed vehicle-inward in the direction of the air cleaner box 14. However, the air cleaner box 14 remains intact as does the fan shroud 17 as well as all of the air conditioner components after the impact event. This is possible because the crushable duct 12 has been has absorbed the energy of the impact and has thus been crushed between the radiator 16 and the air cleaner box 14 as well as other fixed components, thereby substantially vacating the space it formerly occupied.

As noted above, the number, path, placement and depth of each of the grooves, whether formed on the outside of the crushable duct or on the inside, may be modified as required to provide optimum performance in an impact event. While the grooves have been illustrated as being elongated and circumferential, it is to be understood that many variations of the groove pattern are possible including both regular and irregular. It is also to be understood that while grooves have been specified, it is possible that the recessed areas illustrated in the figures as being grooves may also be channels that are, either in the alternative or in combination, polygonal, round or oval in shape or have a mixture of such shapes. The thickness of the first shell 30 and the second shell 32 may be constant or variable.

The duct of the disclosed inventive concept is highly tunable and can be designed and produced to meet a wide variety of demands. Variables include the geometry of the grooves, the choice of material, the thickness of the material, and the groove pattern. Several variations of the duct were produced and subsequent analysis and physical testing confirmed the tunability of the duct in its many variations.

Given the described variables, the crushable duct 12 of the disclosed inventive concept provides the engine designer with maximum flexibility and enables specific tuning for a under hood arrangement. In this way, the repair cost following an impact event may be reduced by reducing or eliminating damage caused to more expensive components without adding weight, cost, or complexity to the air induction system of the vehicle. The disclosed inventive concept may be used with any type of engine.

One skilled in the art will readily recognize from such discussion, and from the accompanying drawings and claims that various changes, modifications and variations can be made therein without departing from the true spirit and fair scope of the invention as defined by the following claims.

What is claimed is:

1. A duct for an air induction system of a vehicle, the duct comprising:
   a body having a length, an inlet, an outlet, an outer surface, and an inner surface;
   a first set of grooves including a set of parallel grooves formed on said outer surface;
   a second set of grooves including a set of circumferential grooves formed on said outer surface, at least some of said second set of grooves intersecting at least some of said first set of grooves, said first set of grooves and said second set of grooves defining separable segments; and
   a third set of grooves including a set of parallel grooves formed on said inner surface.

2. The duct for an air induction system for a vehicle of claim 1, wherein said parallel grooves extend from said inlet to said outlet.

3. The duct for an air induction system for a vehicle of claim 1, wherein said body is formed from a rigid polymerized material.

4. The duct for an air induction system for a vehicle of claim 3, wherein said rigid polymerized material is polypropylene, high-density polyethylene or acrylonitrile styrene acrylate.

5. The duct for an air induction system for a vehicle of claim 1, wherein said body is formed from a first shell and a second shell.

6. The duct for an air induction system for a vehicle of claim 5, wherein said first shell is attached to said second shell by clasps, mechanical fasteners, adhesives or welding.

7. The duct for an air induction system for a vehicle of claim 5, wherein said first shell is attached to said second shell by snap-fit assemblies, each assembly comprising a cantilever snap portion and a latch portion.

8. An air induction system for a vehicle, the system comprising:
   an air filter box having an incoming air side; and
   an air duct formed from a rigid polymerized material, said duct being attached to said incoming air side of said box, said duct having a long axis, an outer surface, an inner surface, an inlet, and an outlet, said duct having a first set of grooves including a set of parallel grooves formed on said outer surface, a second set of grooves including a set of circumferential grooves formed on said outer surface, at least some of said second set of grooves intersecting at least some of said first set of grooves, and a third set of grooves including a set of parallel grooves formed on said inner surface, said first and third sets of grooves generally extending along said long axis between said inlet and said outlet.

9. The air induction system for a vehicle of claim 8, wherein said grooves are parallel.

10. The air induction system for a vehicle of claim 9, wherein said circumferential grooves are circumferentially formed around said air duct.

11. The air induction system for a vehicle of claim 8, wherein said rigid polymerized material is polypropylene, high-density polyethylene or acrylonitrile styrene acrylate.

12. The air induction system for a vehicle of claim 8, wherein said air duct is formed from a first shell and a second shell.

13. An air induction system for a vehicle, the system comprising:
    an air filter box having an incoming air side; and
    an air duct formed from a rigid polymerized material, said duct being attached to said incoming air side of said box, said duct having an exterior surface, an interior surface, a long axis, an inlet, and an outlet, said duct having a first set of parallel grooves and a set of circumferential grooves formed on said exterior surface of said air duct, and a second set of parallel grooves formed on said interior surface, said first set of parallel grooves and said circumferential grooves intersecting,
    wherein said sets of grooves provide a focused area of reduced wall thickness in said duct that is engineered to fail at a specified load.

14. The air induction system for a vehicle of claim 13, wherein said first set of parallel grooves extend along said long axis between said inlet and said outlet.

15. The air induction system for a vehicle of claim 14, wherein said set of circumferential grooves comprises grooves circumferentially formed around said duct.

16. The air induction system for a vehicle of claim 15, wherein said air duct is formed from a rigid polymerized material selected from the group consisting of polypropylene, high-density polyethylene and acrylonitrile styrene acrylate.

* * * * *